(12) United States Patent
Marchisset

(10) Patent No.: US 10,464,179 B1
(45) Date of Patent: Nov. 5, 2019

(54) QUILL STOP

(71) Applicant: Rodger Gabriel Marchisset, Alta Loma, CA (US)

(72) Inventor: Rodger Gabriel Marchisset, Alta Loma, CA (US)

( * ) Notice: Subject to any disclaimer, the term of this patent is extended or adjusted under 35 U.S.C. 154(b) by 0 days.

(21) Appl. No.: 15/903,957

(22) Filed: Feb. 23, 2018

(51) Int. Cl.
*B23Q 5/52* (2006.01)
*B23Q 3/00* (2006.01)
*B23Q 16/00* (2006.01)

(52) U.S. Cl.
CPC ............ *B23Q 5/52* (2013.01); *B23Q 16/001* (2013.01); *B23Q 3/00* (2013.01); *B23Q 2705/22* (2013.01)

(58) Field of Classification Search
CPC ........... B23B 47/28; B23B 49/00; B23B 9/00; B23B 7/00; B23B 7/02; B23B 7/04; B23B 7/08; B23B 7/14; B23B 7/16
USPC ...................................... 81/300–411
See application file for complete search history.

(56) References Cited

U.S. PATENT DOCUMENTS

| | | | | | |
|---|---|---|---|---|---|
| 1,944,116 | A * | 1/1934 | Stratman | ................... | B25B 7/16 188/67 |
| 2,979,032 | A * | 4/1961 | Engquist | ................. | B26B 17/02 269/25 |
| 4,257,135 | A * | 3/1981 | Moebius | ................... | B25B 7/06 29/237 |
| 4,499,797 | A * | 2/1985 | Wilson | ................... | B25B 7/123 81/367 |
| 4,538,485 | A * | 9/1985 | Saila | ......................... | B25B 7/16 81/320 |
| 4,542,669 | A * | 9/1985 | Roux | ...................... | B25B 7/123 81/367 |
| 5,014,578 | A * | 5/1991 | Flentge | ..................... | B25B 7/00 81/323 |
| 6,457,338 | B1* | 10/2002 | Frenken | ................. | B21D 39/04 29/708 |
| 6,711,789 | B2* | 3/2004 | Ping | .......................... | B25B 5/06 24/499 |
| 7,406,897 | B2* | 8/2008 | Hsu | ........................... | B25B 5/06 81/318 |
| 2003/0167882 | A1* | 9/2003 | Chauffeteau | ............. | B25B 7/12 81/9.3 |
| 2006/0137497 | A1* | 6/2006 | Whiteford | .................. | B25B 7/00 81/357 |
| 2008/0110303 | A1* | 5/2008 | McCabe | ............... | B25B 23/103 81/186 |
| 2009/0056510 | A1* | 3/2009 | Buchanan | ................. | B25B 7/10 81/355 |
| 2010/0186558 | A1* | 7/2010 | Hile | ........................ | B25B 7/123 81/370 |
| 2010/0263499 | A1* | 10/2010 | Harris | ...................... | B25B 7/02 81/360 |

(Continued)

*Primary Examiner* — Nicole N Ramos
(74) *Attorney, Agent, or Firm* — The Law Office of Austin Bonderer, PC; Austin Bonderer

(57) ABSTRACT

Embodiments of a quill stop are disclosed. The quill stop can move between an open and closed position. The quill stop has a left and a right securing member, a locking element, a right arm, a left arm, and a left arm spring. The right arm can actuate the locking element out of engagement with a locking projection so that the right securing member and the left securing member can move relative to each other and allow a rod to be inserted between them. The locking element prevents unwanted actuation of the quill stop during operation.

8 Claims, 11 Drawing Sheets

(56) References Cited

U.S. PATENT DOCUMENTS

2012/0042709 A1* 2/2012 Polofsky .................. B25B 7/12
72/409.01

* cited by examiner

QUILL STOP

FIELD

The subject matter herein generally relates to a quill stop.

BACKGROUND

During the use of certain instruments, such as a press or a drill, it is desirable to limit the depth or distance that the instrument travels. Thus quill stops are used to easily allow the user to adjust actuation distance. However, a quill stop is only as good as its ability to stay in place. The issue with currently known quill stops is that when a certain amount of pressure is exerted during the actuation, the quill stop will open and/or slide on the instrument. When a large amount of downward pressure is exerted, the force is translated into a lateral force that causes the quill stop to open. This movement limits the ability of the quill stops to function correctly.

BRIEF DESCRIPTION OF THE DRAWINGS

Implementations of the present technology will now be described, by way of example only, with reference to the attached figures, wherein.

DETAILED DESCRIPTION

Figure 1:
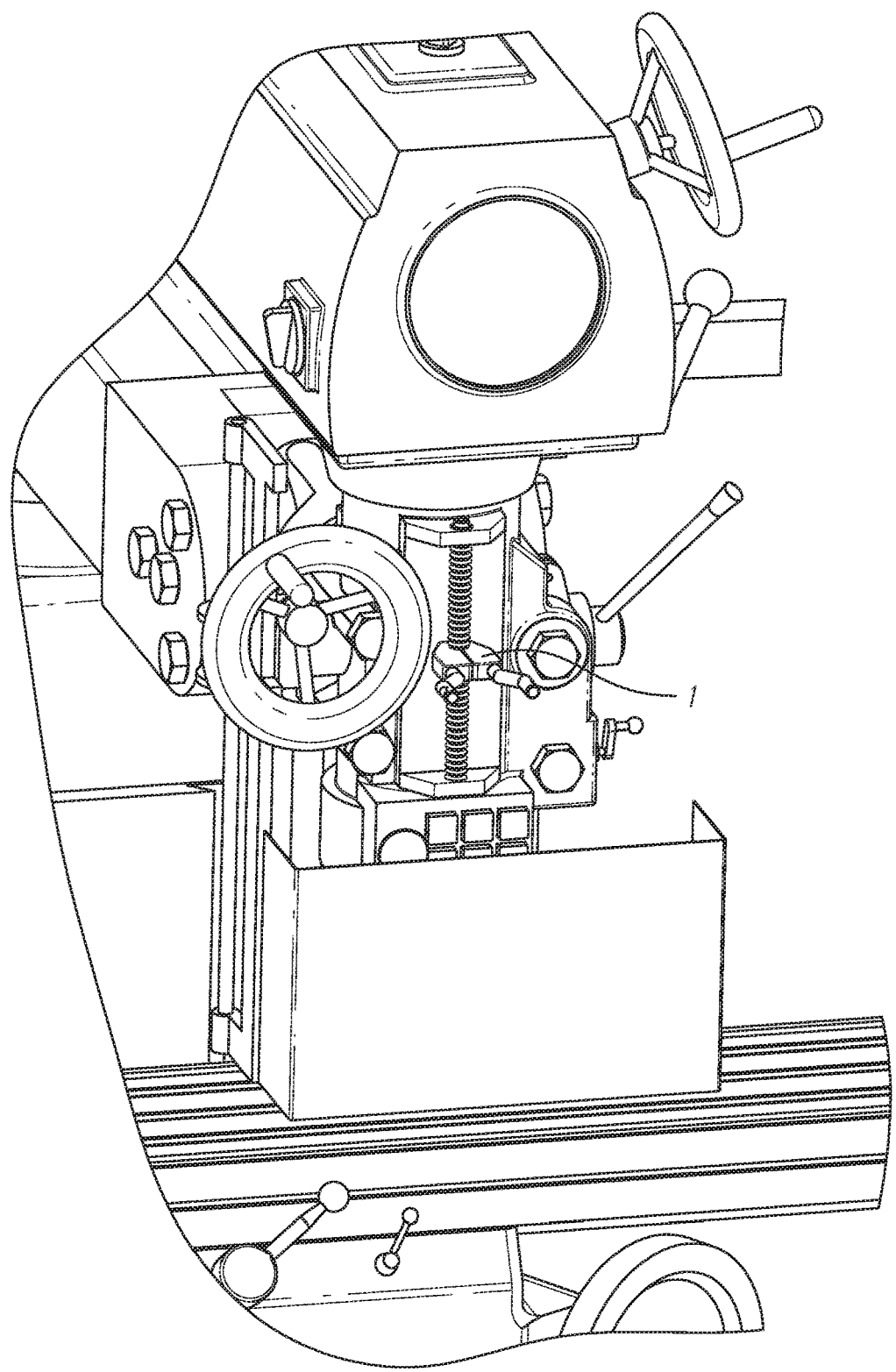
FIG. 1 shows an embodiment of the quill stop in use.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained inside a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a quill stop 1. Quill stops are used on items that actuate like a drill and/or press to quickly limit the range of motion of the actuation.

FIG. 1 illustrates an embodiment of the quill stop 1 used on an actuating piece of machinery such as a drill or a press. As can be seen form the figure, the machinery comprises a threaded rod with a threaded rod pitch.

Figure 2:
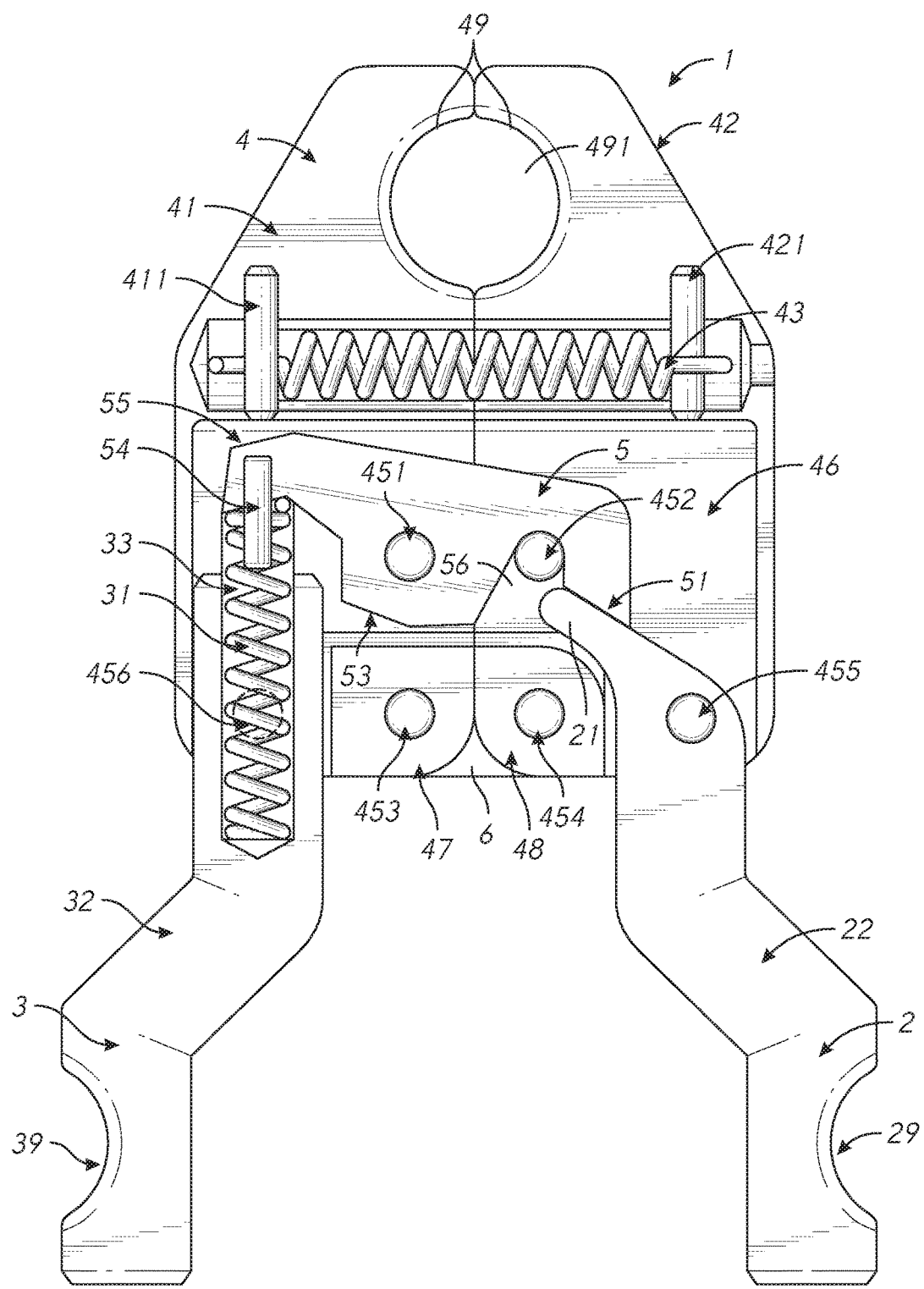
FIG. 2 shows a cross-section of an embodiment of the quill stop in a closed position.

FIG. 2 illustrates an embodiment of the quill stop 1 in a closed position. The quill stop 1 comprises of a right arm 2, a left arm 3, a securing apparatus 4 and a locking element 5.

The right arm 2 comprises right arm actuator 21. The right arm actuator 21, when the quill stop 1 is in the closed position, abuts the locking element 5 at the locking element abutment 51. In some embodiments, the right arm actuator 21 can comprise a rounded surface. In other embodiments, the right arm actuator 21 can comprise a flat surface. The only requirement is that the right arm actuator 21 can cause rotation of the locking element 5 when opening the quill stop 1, and cause re-engagement with the locking element 5 when closing the quill stop 1.

The left arm 3 defines a left arm spring space 33 that at least partially houses the left arm spring 31. The left arm spring 31 abuts the left arm 3 and the locking element 5 and biases the left arm 3 and the locking element 5 away from each other. In some embodiments, the left arm spring 31 can be coupled to the locking element 5 by the spring securing element 54. In some embodiments, the spring securing element 54 can be a dowel pin that will reside in the center of the left arm spring 31. In some embodiments, the depth of the left arm spring space 33 will vary. In some embodiments, the left arm spring space 33 will longer than the length of the left arm 3 that is located inside the securing apparatus housing 46. In some embodiments, the left arm spring space 33 will be least that the length of the left arm 3 that is located inside the securing apparatus housing 46. Accordingly, some properties of the left arm spring 31 will be selected according to the depth of the left arm spring space 33. Additionally, the strength of the left arm spring 31 can be selected according to need and desired resistance.

The locking element 5 comprises the locking element abutment 51 that abuts the right arm actuator 21 when the quill stop 1 is in the closed position. The locking element 5 is prevented from horizontal movement by the locking projection 452, which is received in the locking projection receiving space 56 until the locking element 5 pivots about a locking element pivot 451. The locking element 5 can be housed inside the securing apparatus housing 46. In some embodiments, the locking element pivot 451 and/or the locking projection 452 is integral with the securing apparatus 4. In some embodiments, the locking element pivot 451 and/or the locking projection 452 are projections (e.g., dowel, pin, screw) that are coupled the securing apparatus 4. In some embodiments, the locking element 5 defines a top surface 55 and a bottom surface 53. The locking element 5 helps to prevent unwanted opening of the quill stop 1. The quill stop 1 can only open once the locking projection 452 is free of the locking projection 452.

The securing apparatus 4 comprises of left securing member 41, right securing member 42, securing spring 43, and an engagement portion 49. The left securing member 41 and the right securing member 42 define a securing apparatus housing 46. The securing spring 43 is coupled to both the left securing member 41, by the left securing member spring retainer 411 and the right securing member 42, by the right securing member spring retainer 421. In some embodiments, the left securing member spring retainer 411 and/or the right securing member spring retainer 421 comprise a dowel pin. In some embodiments, the left securing member spring retainer 411 and/or the right securing member spring retainer 421 are integral with the securing apparatus housing 46. The securing apparatus housing 46 houses the locking element pivot 451, the locking projection 452, the left stop 47, and the right arm abutment 48. In some embodiments, the left stop 47 is coupled to the left securing member 41 by the left stop connector 453, and in other embodiments, the left stop 47 is integral with the left securing member 41. The base of the left securing member 41 and the right securing member 42 are attached by a base element 6. The base element 6 will allow for rotational movement of the left securing member 41, the right securing member 42, or both the left securing member 41 and the right securing member 42. In some embodiments, the base element 6 is a bracket. In some embodiments, the base element 6 is coupled to the left stop connector 453, the right arm abutment connector 454 or both the left stop connector 453 and the right arm abutment connector 454. In some embodiments, the base element 6 is integral with the left securing member 41 or the right securing 4 member 42. In some embodiments, the right arm abutment 48 is coupled to the right securing member 42 by the right arm abutment connector 454, and in other embodiments, the right arm abutment 48 is integral with the right securing member 42. In some embodiments, the left stop 47 and the right arm abutment 48 have corresponding surfaces that will abut each other during actuation of the quill stop 1. In some embodiments, the left stop connector 453 and/or the right arm abutment connector 454 are integral with the securing apparatus 4. In some embodiments, the left stop 47 and the right arm abutment 48 have corresponding curvatures that face each and abut each other, during the opening of the quill stop 1.

The engagement portion 49 defines an engagement space 491. When a shaft of a device is inserted via the gap 492 into the engagement space 491 and the arms are released, the engagement portion 49 will be secured to the shaft. In some embodiments, the engagement portion 49 will have a thread that corresponds to a thread of a pre-selected shaft design. In some embodiments, The right arm 2 is coupled to the right securing member 42 in a pivotal manner by the right arm securing member 455. In some embodiments, the right arm securing member 455 is a pin coupled to the securing apparatus 4. In some embodiments, the right arm securing member 455 is integral with the securing apparatus 4. The left arm 3 is coupled to the left securing member 41 by the left arm securing member 456. In some embodiments, the left arm 3 is coupled to the left securing member 41 in a pivotal manner by the left arm securing member 456. In some embodiments, the left arm 3 is unable to move in relation to the left securing member 41.

Figure 3:
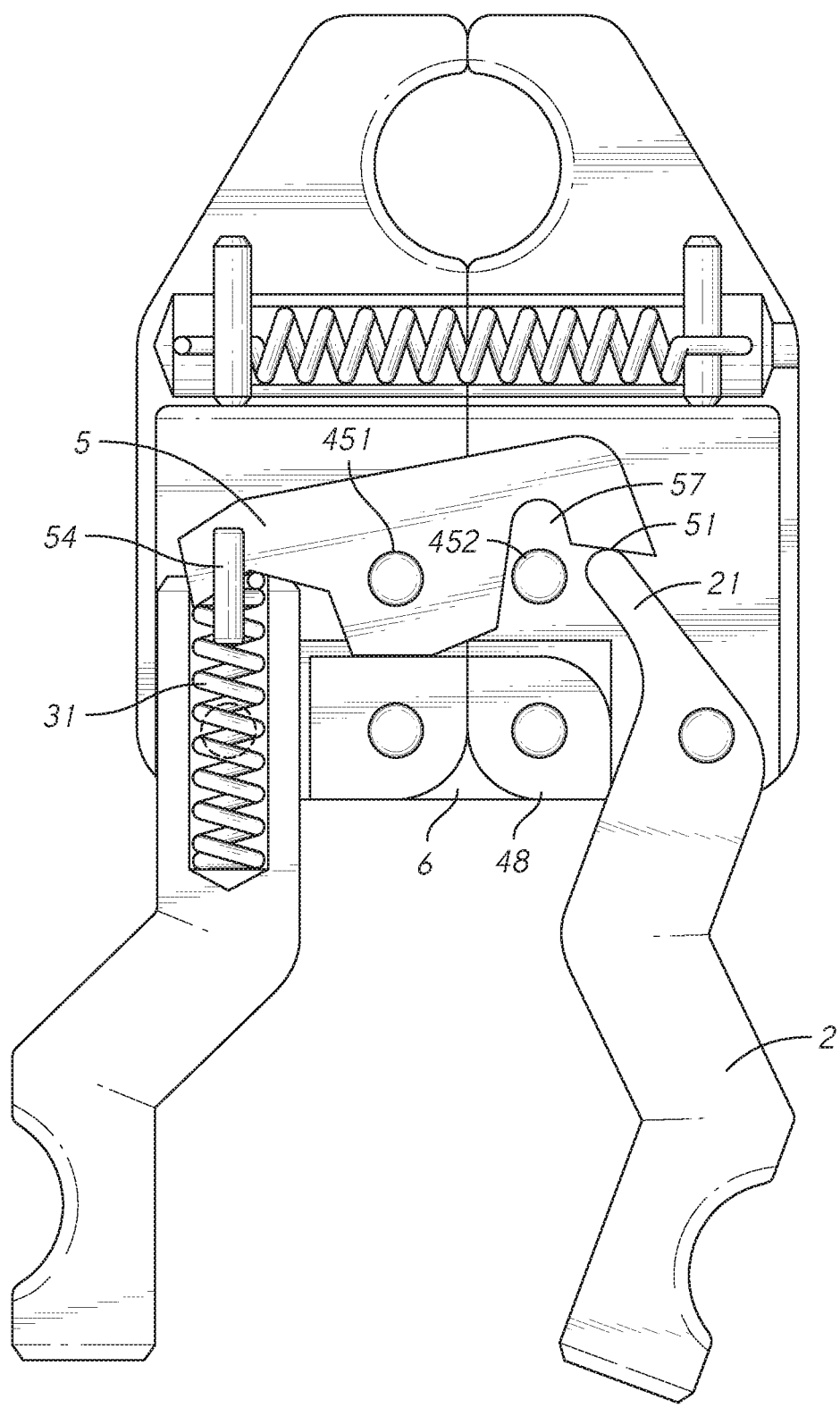
FIG. 3 shows a cross-section of an embodiment of the quill stop in the initial stages of being opened.

FIG. 3 illustrates an embodiment of the quill stop 1 during the initial stages of being actuated to an open position. When a compression force is applied to the right arm 2 and the left arm 3, the right arm 2 rotates about the right arm securing member 455 until the right arm 2 abuts the right arm abutment 48. While the right arm 2 is rotated, the right arm actuator 21 applies force to the locking element abutment 51. This movement will cause the locking element 5 to rotate about the locking element pivot 451 and free the locking element 5 from the locking projection 452. The rotation will cause the locking element 5 to compress the left arm spring 31. The rotation will cease when the bottom surface 53 prevents further movement. In some embodiments, the bottom surface 53 will abut the left arm 3 abutment.

Figure 4:
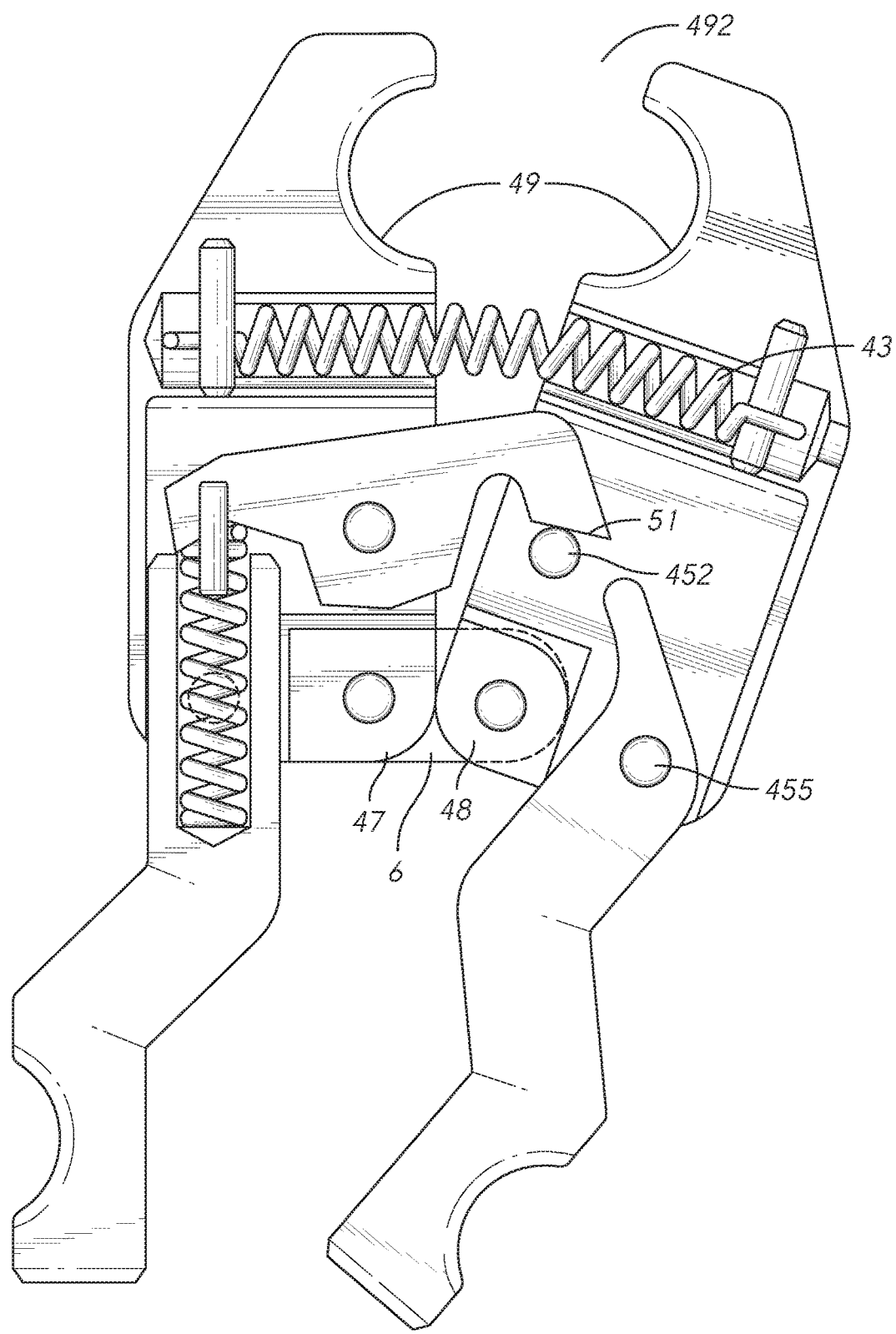
FIG. 4 shows a cross-section of an embodiment of the quill stop in an open position.

FIG. 4 illustrates an embodiment of the quill stop 1 in the open position. Upon further application of force, the right securing member 42 will rotate in relation to the left securing member 41. In some embodiments, the right arm's 2 abutment against the right arm abutment 48, abutment against an interior projection (not shown), abutment against the interior wall of the securing apparatus housing 46, or a combination thereof, causes the rotation of the right securing member 42 in relation to the left securing member 41. Additionally, the locking element abutment 51 will abut, and slide along as needed, the locking projection 452. In some embodiments, the right arm actuator 21 will be free of contract with the locking element abutment 51 when in the quill stop 1 is in the open position. In some embodiments (not shown), the locking element abutment 51 will remain in contact with the right arm actuator 21 in all positions. Upon rotation of the right securing member 42, in relation to the left securing member 41, the securing spring 43 will be actuated against its biasing force, and a gap 492 between the left securing member 41 and the right securing member 42 will be established. The gap 492 will allow an element (e.g., a shaft) to enter between the right securing member 42 and the left securing member 41.

Upon releasing force from the right arm 2 and/or the left arm 3, the securing spring 43 will recoil and the left arm spring 31 will expand to force the right securing member 42 to abut the left securing member 41. The locking element abutment 51 will engage the right arm actuator 21 and force its rotation back to its initial state.

Figure 5:
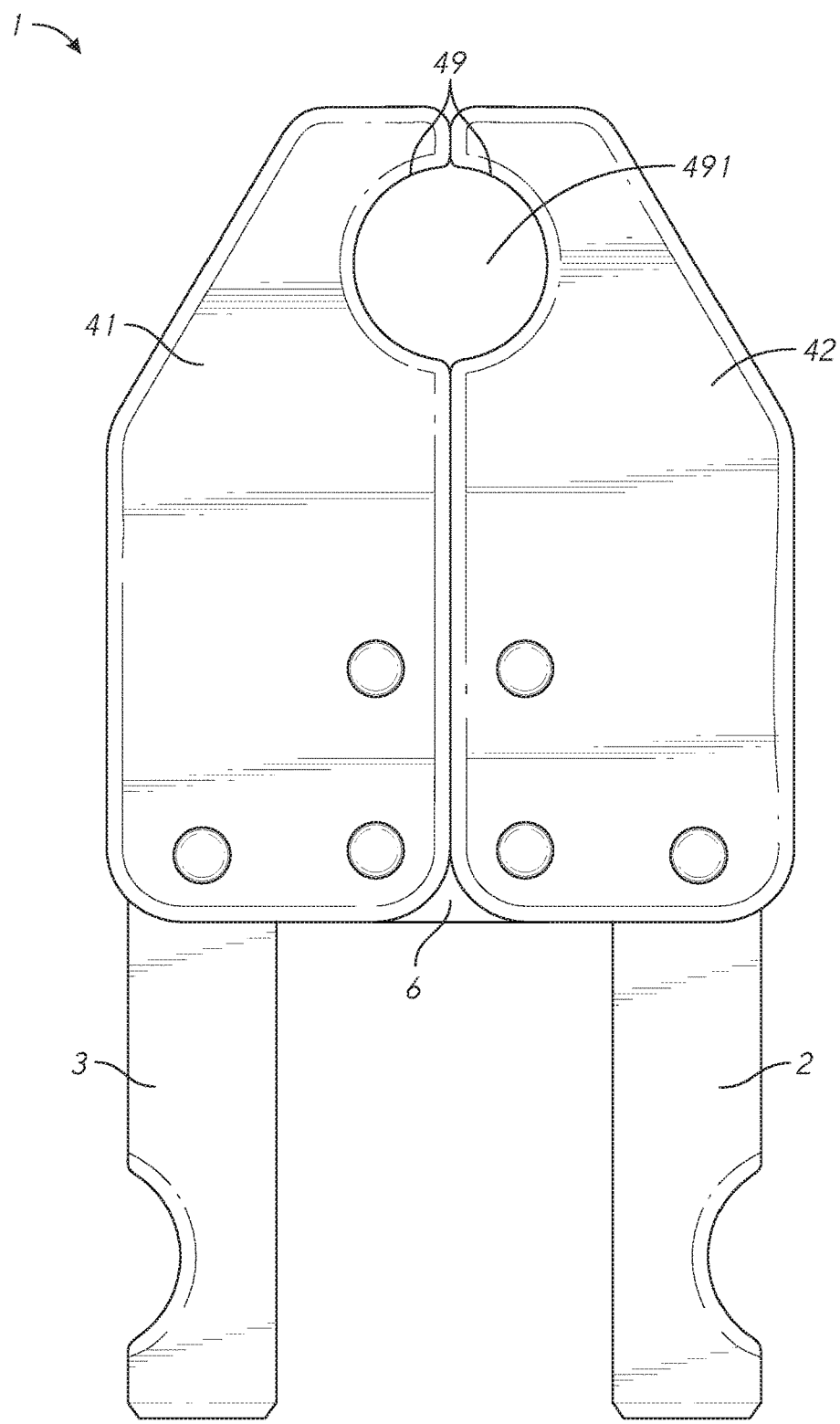
FIG. 5 shows an embodiment of the quill stop in the closed position.

FIG. 5 illustrates an embodiment having straight arms as seen from the exterior.

Figure 6:
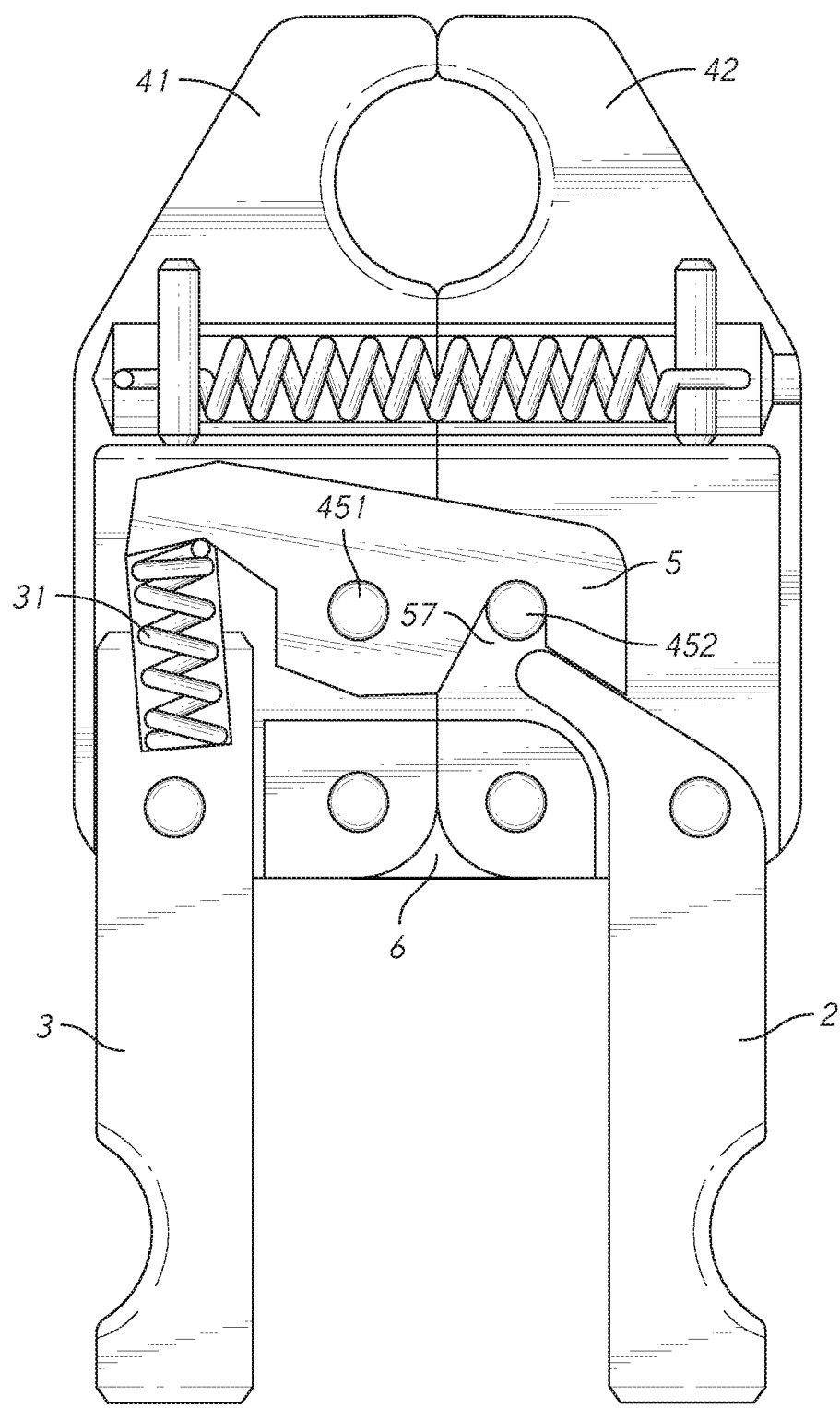
FIG. 6 shows a cross-section of an embodiment of the quill stop in the closed position.

FIG. 6 illustrates an embodiment having straight arms and wherein the left arm securing member 456 extends all the way through the left arm 3. The embodiment shown also provides an example of a shorter left arm spring 31. The left arm securing member 456 can extend all the way through because the left arm spring 31 is shorter as compared to the embodiment shown in FIG. 2. In some embodiments (not shown), the left arm securing member 456 will engage and secure the left arm spring 31 in the left arm spring space 33.

Figure 7:
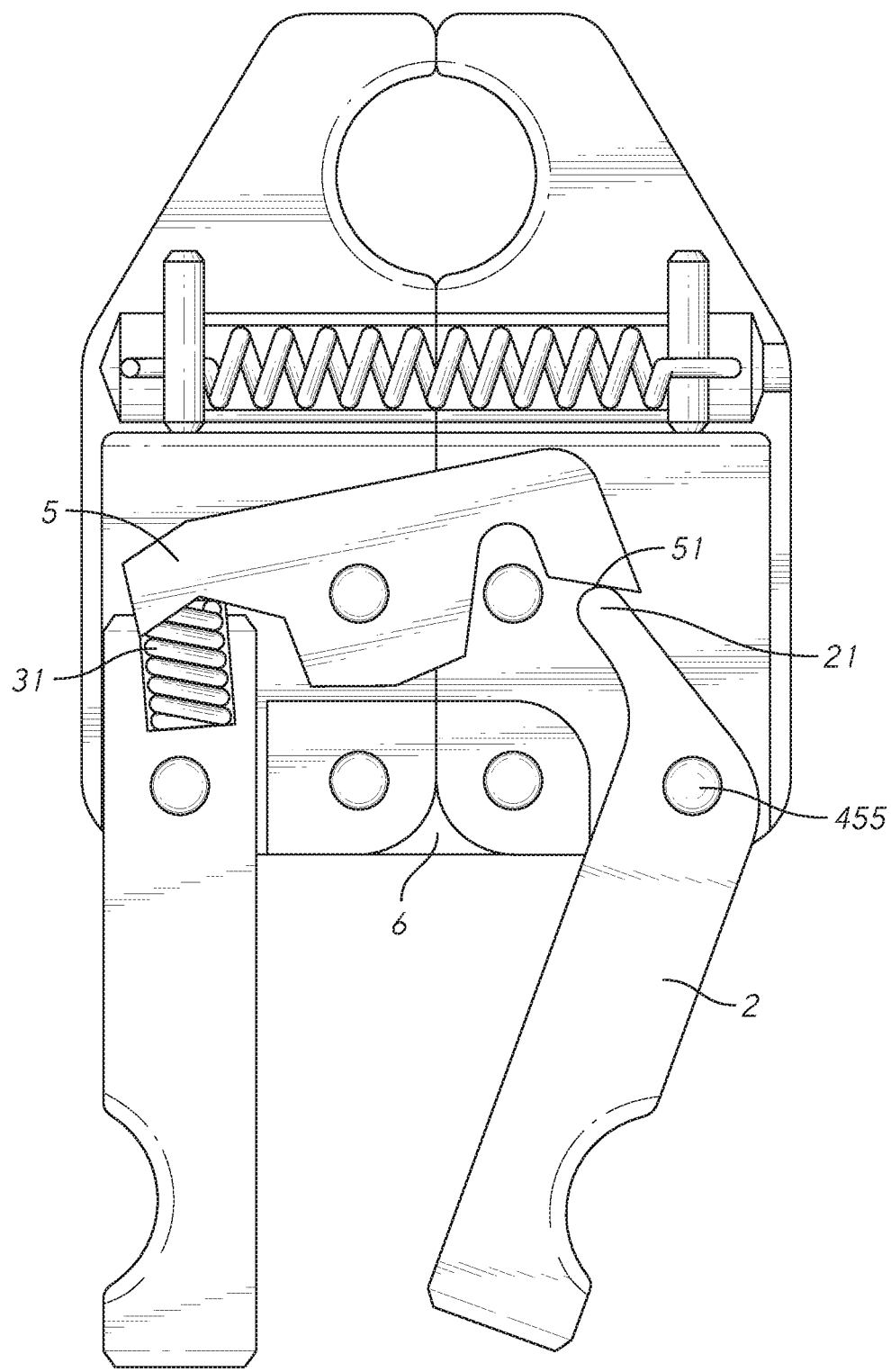
FIG. 7 shows a cross-section of an embodiment of the quill stop in the initial stages of being opened.

FIG. 7 illustrates an embodiment of the quill stop 1 during the initial stages of being actuated. When a compression force is applied to the right arm 2 and the left arm 3, the right arm 2 rotates about the right arm securing member 455 until the right arm 2 abuts the right arm abutment 48. While the right arm 2 is rotated, the right arm actuator 21 slides along the locking element abutment 51. This movement will force the locking element 5 to rotate about the locking element pivot 451 and free the locking element 5 from the locking projection 452. The rotation will cause the locking element 5 to compress the left arm spring 31. In some embodiments, the rotation will cease when the bottom surface 53 prevents further movement by abutting the left arm 3 abutment.

Figure 8:
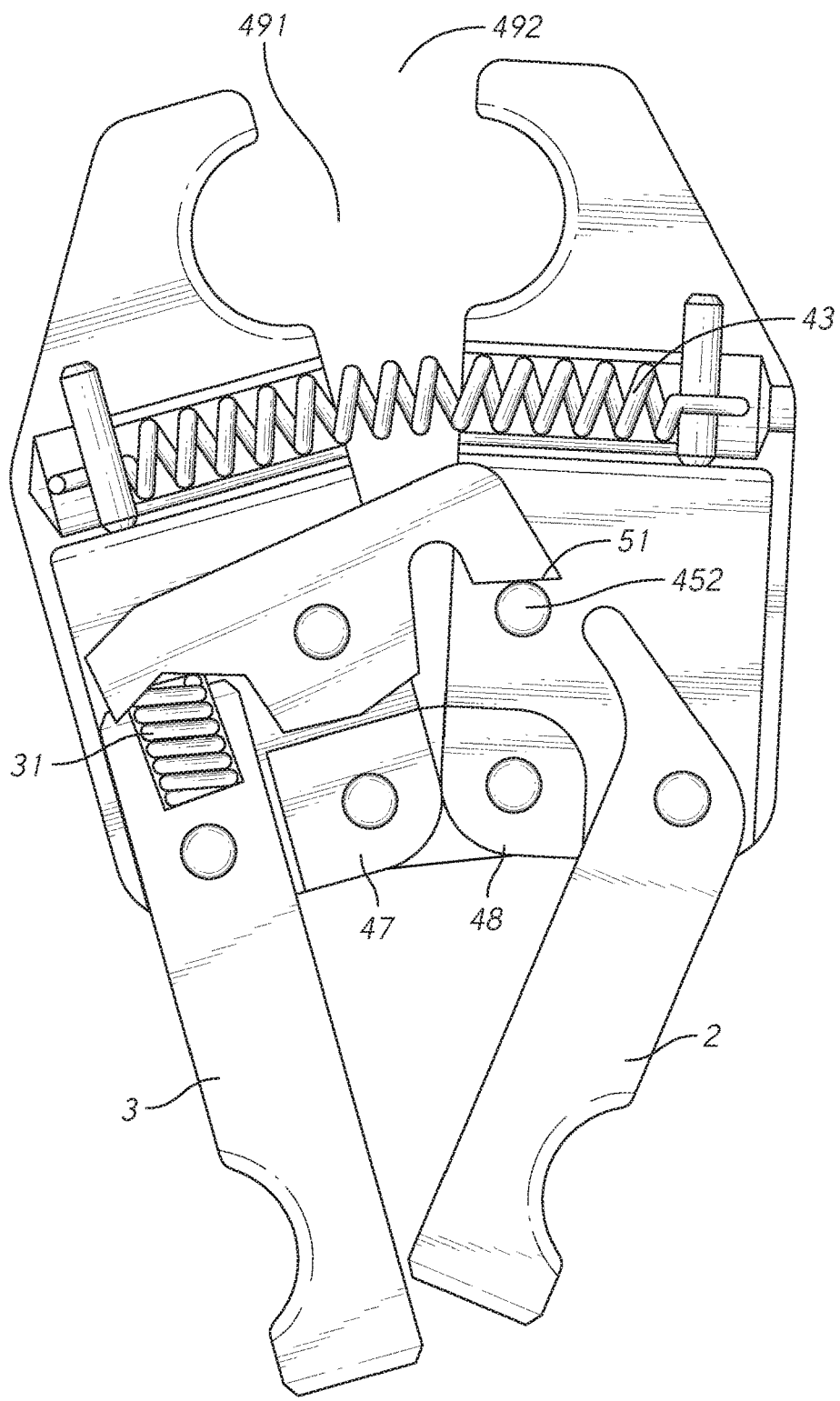
FIG. 8 shows a cross-section of an embodiment of the quill stop in an open position.

FIG. 8 illustrates an embodiment of the quill stop 1 in the open position. Upon further application of force, the right securing member 42 will rotate in relation to the left securing member 41. In some embodiments, the right arm's 2 abutment against the right arm abutment 48, abutment against an interior projection (not shown), abutment against the interior wall of the securing apparatus housing 46, or a combination thereof, causes the rotation of the right securing member 42 in relation to the left securing member 41. Additionally, the locking element abutment 51 will abut, and slide along as needed, the locking projection 452. In some embodiments, the right arm actuator 21 will be free of contract with the locking element abutment 51. Upon rotation of the right securing member 42 in relation to the left securing member 41, the securing spring 43 will be actuated against its biasing force, and a gap 492 will be established to allow an element to enter between the right securing member 42 and the left securing member 41.

Upon releasing force from the right arm 2 and/or the left arm 3, the securing spring 43 will recoil, and the left arm spring 31 expand to force the right securing member 42 to abut the left securing member 41. The locking element abutment 51 will engage the right arm actuator 21 and force its rotation back to its initial state.

Figure 9:
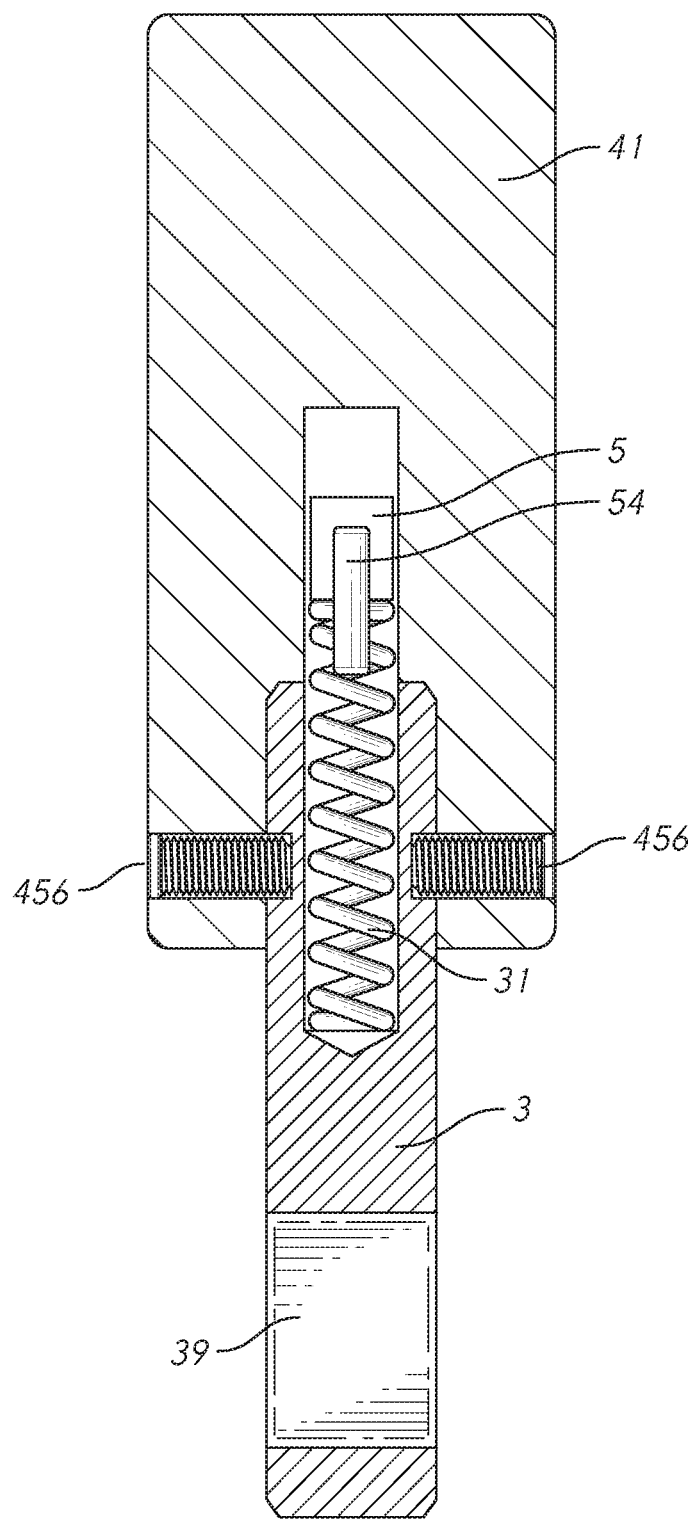
FIG. 9 shows side cross-section of an embodiment of the quill stop.

FIG. 9 illustrates an embodiment of the quill stop 1 wherein the left arm 3 is coupled to the left securing member 41 by two left arm securing members 456 and 456'. In some embodiments, the left arm securing member 456 comprises two threaded elements that are secured from outside the securing apparatus housing 46. In some embodiments, the threaded elements are screws.

Figure 10:
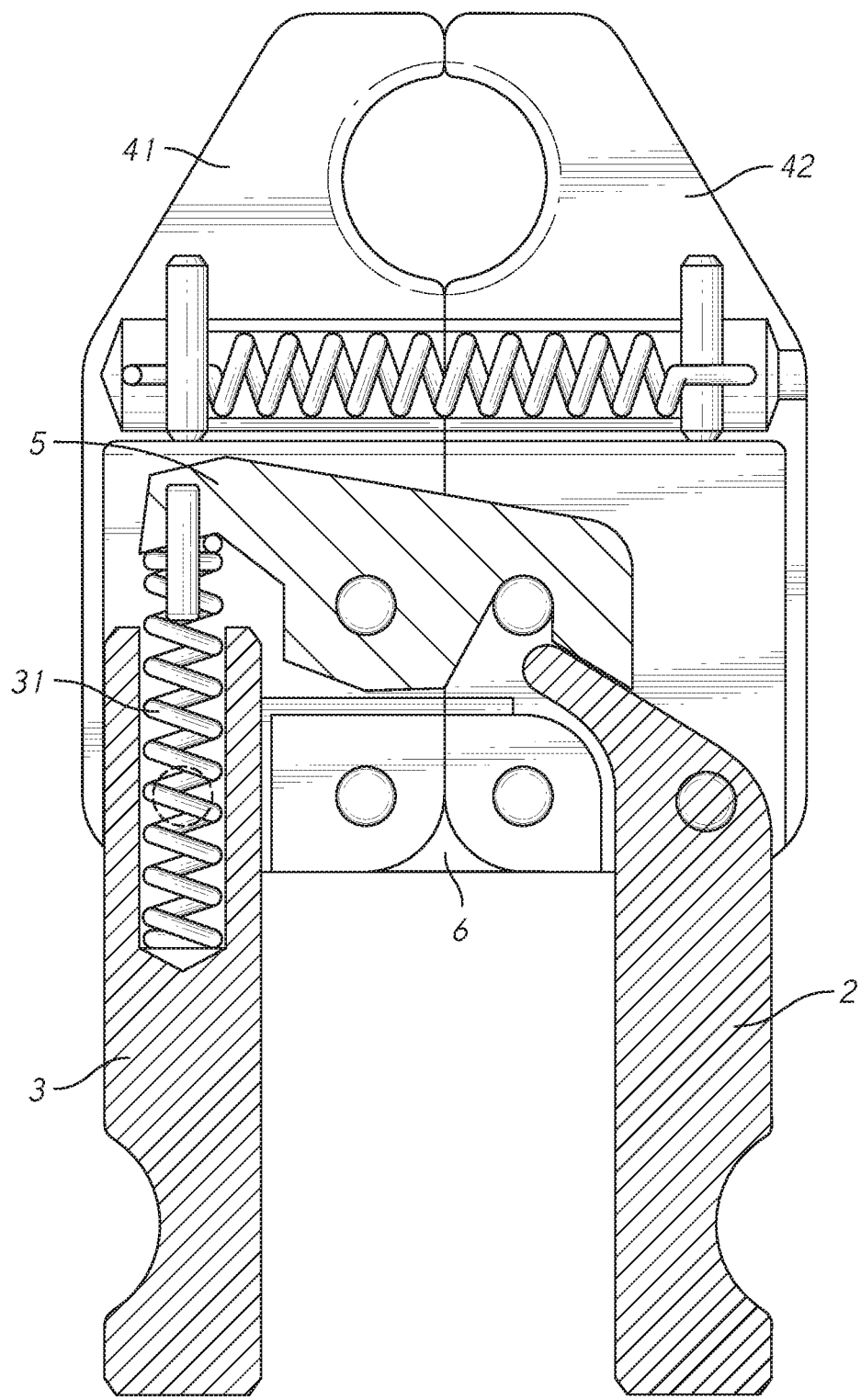
FIG. 10 shows a cross-section of an embodiment of the quill stop in the closed position.

FIG. 10 illustrates an embodiment of the quill stop 1 that is similar to the embodiment shown in FIG. 2, but the right arm 2 and the left arm 3 are substantially linear as opposed to arched.

Figure 11:
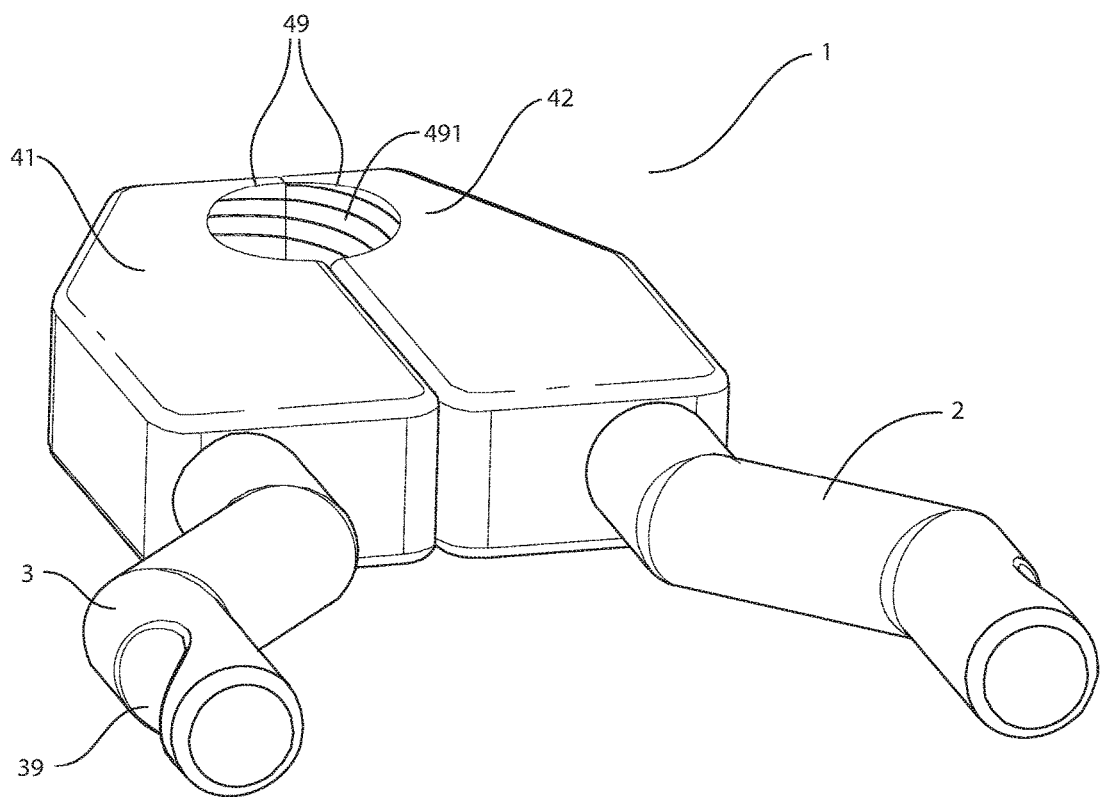
FIG. 11 shows a perspective view of an embodiment of the quill stop.

FIG. 11 illustrates an embodiment of the quill stop 1 that is similar to the embodiment shown in FIG. 1, but the machinery and the threaded rod are not shown.

In some embodiments, the right arm 2 and the left arm 3 are angled away from each other. In some embodiments, both the right arm 2 and the left arm 3 are more linear. In some embodiments (not shown) one of the right arm 2 or the left arm 3 is angled. Some embodiments have them angled toward each other, and other embodiments are angled away from each other. Linear arms provide for less actuation and limit the width of the gap 492 space. The more space between the arms enables more actuation of the securing members 41 and 42. The distance that the arms can travel towards each other effects the size of the gap 492. In some embodiments, the left arm 3 comprises a left arm angled portion 32 and/or a left arm indentation 39. In some embodiments, the right arm 2 comprises a right arm angled portion 22 and/or a right arm indentation 29. The indentations, when present, can make the quill stop 1 more user-friendly by making it easier to grip by a user.

In some embodiments, the engagement portion 49 is threaded to be secured to a ½"-20 rod.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however, it is disclosed that elements of disclosed embodiments can be switched with corresponding elements of embodiments with the same name and/or number of other disclosed embodiments. It is also noted that directional terms (e.g., left, right, top, bottom) are used in reference to certain parts. The terms are only used as a means to describe and explain the embodiments. It is clear that when viewed from a different angle, the element described as being left for example, may now, in fact, be on the right.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
   a threaded rod, wherein the threaded rod comprises a threaded rod pitch;
   a quill stop, attached to the threaded rod and capable of moving between an open position and a closed position, comprising:
   a left securing member comprising a locking element pivot;
   a right securing member comprises a locking projection;
   an engagement portion defined by the left securing member and the right securing member, wherein the engagement portion defines a thread the thread has a pitch that corresponds to the threaded rod pitch;
   a locking element that defines a locking projection receiving space and comprises a locking element abutment, wherein the locking element is configured to rotate about the locking element pivot;
   a right arm comprising a right arm actuator;
   a left arm defining a left arm spring space;
   a left arm spring located at least partially inside the left arm spring space, wherein the left arm spring biases the locking element away from the left arm and the locking element into abutment of the locking projection;
   a securing spring coupled to the left securing member and the right securing member, wherein the securing spring biases the left securing member and the right securing member together;
   wherein when the quill stop is in the closed position and attached to the threaded rod, the engagement portion defines an engagement space and the engagement space is fully enclosed; the engagement portion thread engages the treaded rod the right arm actuator abuts the locking element abutment, and the locking projection is located inside the locking projection receiving space; when the quill stop is in the open position the locking element abutment abuts the locking projection, the left arm spring is compressed, and the securing spring is expanded.

2. The apparatus of claim 1, wherein the securing spring is coupled to the left securing member by a left securing member spring retainer, and the securing spring is coupled to the right securing member by a right securing member spring retainer.

3. The apparatus of claim 1, wherein the left securing member and the right securing member define a securing member housing when the quill stop is in the closed position, and the locking element is located inside the securing member housing.

4. The apparatus of claim 1, wherein the quill stop further comprises a right arm abutment and a left stop; and
   when the quill stop is in the closed position, and a compression force is applied to move the left arm and the right arm relative to each other:
      the right arm will rotate in relation to the right securing member;
      the right arm actuator will move the locking element so that the locking projection is freed from the locking projection receiving space;
      the locking element will cause compression of the left arm spring;
      the right arm will abut the right arm abutment;
      the right securing member will rotate in relation to the left securing member as the right arm abutment uses the left stop as a fulcrum; and
      the locking element abutment will abut and slide along the locking projection as the left securing member and the right securing member separate.

5. The apparatus of claim 1, wherein the quill stop further comprises a right arm abutment and a left stop, and the right securing member further comprises a right arm securing element; and
   when the quill stop is in the open position, and a compression force that maintains the quill stop in the open position is removed from the left arm and the right arm:
      the securing spring biases the left securing member and the right securing member together,
      the locking element abutment will slide along the locking projection and engage the right arm abutment; and
      the locking element will cause the right arm to rotate about the right arm securing element.

6. The apparatus of claim 1, wherein the right arm comprises a right arm angled portion.

7. The apparatus of claim 1, wherein the right securing member further comprises a pin, and the right arm is configured to rotate about the pin.

8. An apparatus comprising:
a quill stop, capable of moving between an open position and a closed position, comprising:
   a left securing member comprising a locking element pivot;
      a right securing member comprises a locking projection and a right arm securing element;
      an engagement portion defined by the left securing member and the right securing member, wherein the engagement portion is threaded;
   a locking element that defines a locking projection receiving space and comprises a locking element abutment, wherein the locking element is configured to rotate about the locking element pivot;
   a right arm comprising a right arm actuator;
   a left arm defining a left arm spring space;
   a left arm spring located at least partially inside the left arm spring space, wherein the left arm spring biases the locking element away from the left arm and the locking element into abutment of the locking projection;
   a securing spring coupled to the left securing member and the right securing member, wherein the securing spring biases the left securing member and the right securing member together;
   a right arm abutment; and
   a left stop
   wherein when the quill stop is in the closed position, the engagement portion defines an engagement space and the engagement space is fully enclosed; the right arm actuator abuts the locking element abutment, and the locking projection is located inside the locking projection receiving space; when the quill stop is in the open position the locking element abutment abuts the locking projection, the left arm spring is compressed, and the securing spring is expanded; and when the quill stop is in the open position, and a compression force that maintains the quill stop in the open position is removed from the left arm and the right arm:
   the securing spring biases the left securing member and the right securing member together,
   the locking element abutment will slide along the locking projection and engage the right arm abutment; and
   the locking element will cause the right arm to rotate about the right arm securing member.

* * * * *